UNITED STATES PATENT OFFICE.

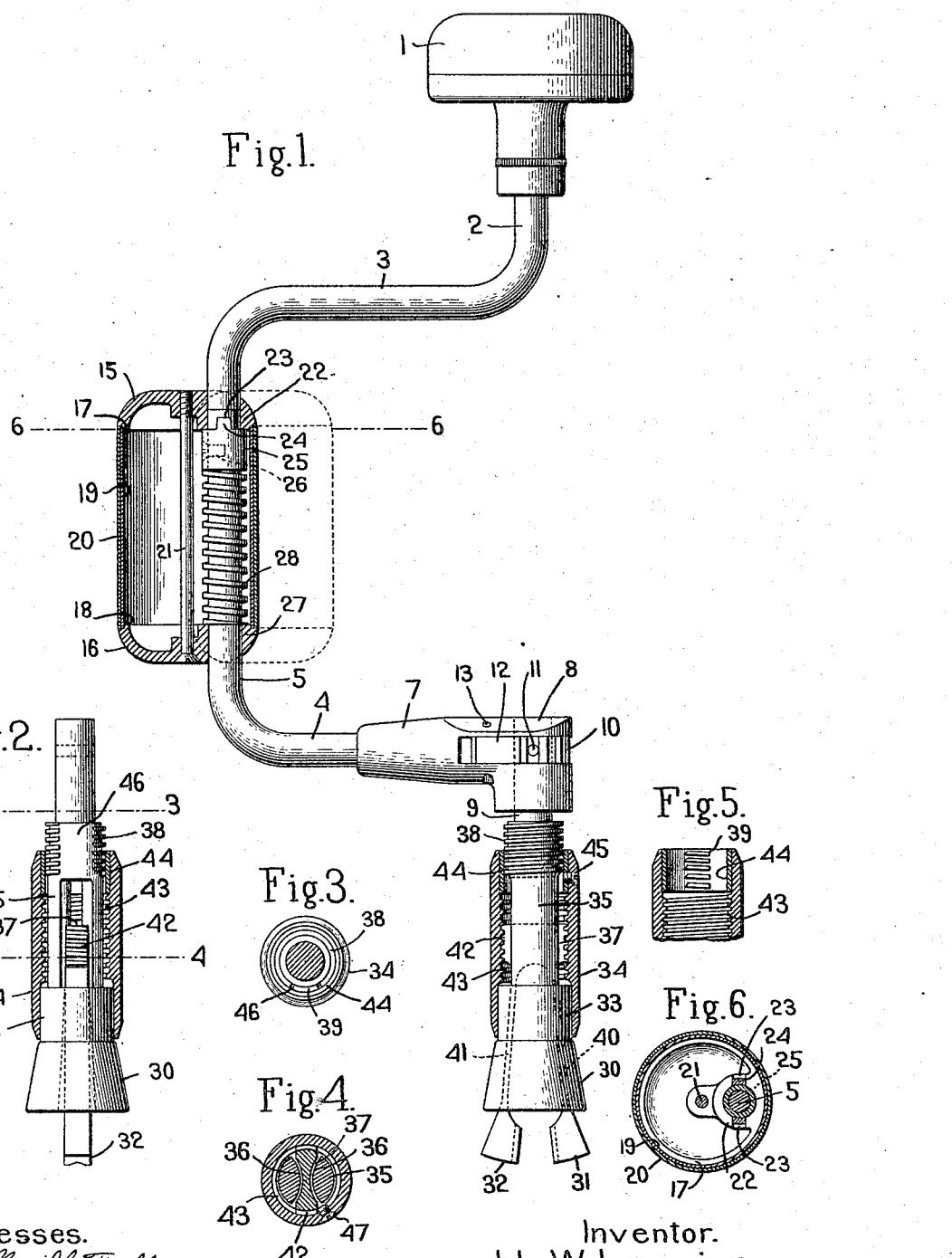

JOHN W. LOVERING, OF SANDOWN, NEW HAMPSHIRE.

BIT STOCK OR BRACE.

1,186,670. Specification of Letters Patent. Patented June 13, 1916.

Application filed April 6, 1914. Serial No. 829,739.

*To all whom it may concern:*

Be it known that I, JOHN W. LOVERING, a citizen of the United States, residing at Sandown, county of Rockingham, State of New Hampshire, have invented an Improvement in Bit Stocks or Braces, of which the following description, in connection with the accompanying drawing, is a specification, like characters on the drawing representing like parts.

This invention relates to improvements in bit stocks or braces and comprises novel means for varying the effective leverage upon the bit or tool and also a novel means for quickly and effectively clamping the shank of the bit or tool in the holding chuck.

In the use of bit stocks it is often desirable to lengthen the effective leverage upon the tool when working upon hard material or where driving a screw into hard wood, or loosening a rusted screw, and it is also desirable at times to use a shorter leverage to decrease the radius of rotation for rapid work or to permit the bitstock to be used in relatively narrow places.

One of the objects of the present invention is to provide means for accomplishing these results, which as shown in the preferred embodiment comprises a hand grip so mounted upon the handle member or sweep of the frame of the bit stock or brace that it may be moved thereon in radial relation to the axis of the tool to increase or decrease the diameter of the circle through which the hand grip is moved.

Another object of the invention is to provide means whereby the changes aforesaid may be accomplished quickly and without removing the bitstock from the work and which in the embodiment of the invention disclosed herein comprises means for securing the hand grip eccentrically on the handle of the bit stock so that by merely sliding the gripping member longitudinally of the frame or sweep it may be released from locking engagement therewith and rotated to a different position whereupon it may be released to reëngage the frame or sweep in its adjusted position.

It is well known that bitstocks are adapted to use a variety of tools and that, especially in carpentry, it frequently is necessary to substitute one tool for another.

Another object of this invention is to provide the tool holding chuck with means adapted to open or close the chuck jaws quickly and effectively. In the preferred embodiment disclosed herein this result is accomplished by a sleeve provided with screw threads of opposite pitch adapted to coöperate simultaneously respectively with threads on the shank of the chuck and with threads on the jaw members. Means are also provided whereby the sleeve may be moved axially of said body portion to bring the jaws nearly to gripping position before it is rotated to clamp the tool shank so that the clamping action may be completed in less than a full rotation of the sleeve.

Other objects of the invention will more fully appear from the following description, and the accompanying drawings, and will be particularly pointed out in the subjoined claims.

In the preferred embodiment of the invention illustrated in the accompanying drawings, Figure 1 is a side elevation of a bitstock embodying my invention, members of the hand grip and chuck being shown in section, Fig. 2 is a detail view of the chuck at right angles to the position illustrated in Fig. 1, the sleeve being shown in section, Fig. 3 is a sectional and plan view of the chuck on lines 3—3 Fig. 2, Fig. 4 is a sectional view on lines 4—4 Fig. 2, Fig. 5 is a detail longitudinal sectional view of a portion of the chuck sleeve showing the screw threads for engaging the jaw member and also the segment of screw threads of opposite pitch which engage the threads on the shank of the clutch, Fig. 6 is a sectional view on line 6—6 Fig. 1.

The bit-stock embodying one of the preferred forms of my invention which is illustrated in the accompanying drawings comprises the usual shoulder piece 1 rotatably mounted upon the end 2 of the usual offset or U-shaped frame, having parallel arms 3—4 disposed radially in respect to the axis of the member 1 and the axis of the tool chuck which is alined therewith, said arms being connected with the usual handle member or sweep 5. The end of the arm 4 preferably is provided with a member 7 having a socket 8 to receive the shank 9 of the chuck, and bifurcated to receive a ratchet wheel 10 which may be secured to the shank 9 by a pin 11 to retain said shank rotatably in said socket. Oppositely disposed pawls may be pivotally mounted on pins 13 in said member 7 to lock said ratchet from rotation or by disengaging one or the other to permit rotation of the chuck and tool in either a right or left hand direction upon oscillation of the handle member of the bit stock in the well known manner. The parts thus far described may be of the usual construction.

One of the principal objects of the invention is to provide means for changing the diameter of the circle through which the axis of the hand grip is moved with the consequent variation of the effective leverage upon the bit or tool without lessening the strength of the bit stock frame or introducing parts which will interfere with its rigidity.

Another object of the invention is to provide means which can be adjusted quickly and easily without removing the tool from the work.

These purposes are accomplished in the present invention by so mounting the hand grip on the handle member or sweep that the axis of the hand grip may be shifted from one side of the axis of the handle portion or sweep of the frame to the other. It will be obvious that the adjustment may be made in several ways and that the preferred embodiment shown in the drawing is only illustrative of the best manner in which I have thus far embodied my invention.

As illustrated in the accompanying drawing the hand grip is constructed of two preferably dome shaped heads 15 and 16 desirably drop forgings having annular interior flanges 17, 18 to receive a spacing sleeve 19. A relatively rotatable sleeve 20 adapted to be grasped by the hand preferably surrounds the spacing sleeve 19. The heads 15 and 16 may be clamped upon the spacing sleeve 19 by a central screw 21 but it will be obvious that the parts may be assembled in various other ways. Each head desirably is provided at one side of its axis with a thickened portion or boss having a central aperture to receive the handle member or sweep 5, the boss 22 of the head 15 being provided with locking members such as oppositely disposed recesses 23 adapted to engage coöperating locking members, as lugs 24 projecting from a collar 25 rigidly secured to the handle member of the frame. For convenience in assembling the collar desirably may be secured to the handle member by a screw 26. The boss 27 on the opposite head has a flat surface forming a seat for a helical spring 28 which desirably surrounds the sweep 5 and is interposed under compression between the boss 27 and the end of the collar 25.

By the construction above described the hand grip is mounted eccentrically upon the sweep so that it may be positioned with its axis beyond the axis of the handle portion 5 as shown in full lines Fig. 1 to provide a maximum leverage on the tool, or may be rotated relatively to said sweep into the position shown in dotted lines to rotate in a minimum circle. The operator is able to shift the hand grip from one position to the other without removing the tool from the work by merely drawing the hand grip toward him against the resistance of the spring until the interlocking members 23, 24 are disengaged, then rotating the hand grip about the member 5 until the interlocking members again register, then releasing the hand grip whereupon the spring 28 will force the interlocking members into engagement.

Another important object of the present invention is to provide a tool holding chuck for a bit stock or other device which may be operated quickly to clamp or to release the tool.

The preferred form of chuck shown in the accompanying drawing comprises a body portion, having a conoidal end 30 suitably grooved to form angular seats for the tool shanks and slideways for the tool holding jaws 31, 32, a cylindrical portion 33 to serve as a bearing for the end of the clamping sleeve 34, a slotted middle portion 35, the walls 36 of the slot preferably being curved, as shown in Fig. 4 to provide ways for the base 37 of sliding jaws, a base portion having interrupted screw threads 38 adapted to be engaged by a threaded segment 39 on the clamping sleeve 34 as will be explained hereinafter, and the usual shank 9.

The jaws 31, 32 preferably are formed upon or secured to the ends of springs 40, 41 extending divergently from the sliding base 37 and preferably integral therewith. The lateral edges of the base 37 are provided with preferably left hand screw threads 42 which are constantly in engagement with a series of complementary threads 43 on the interior of the forward portion of the sleeve 34 so that as the sleeve is rotated to the right relative to the body portion of the chuck the jaws will be retracted within the conical end 30 thereof and caused to close, while rotation of the sleeve in the opposite direction will extend the jaws permitting them to open under the influence of the springs 40, 41.

It will be noted that, by the construction above described, the sliding base 37 of the jaws is at all times in engagement with the sleeve 34; that both are slidable longitudinally of the body portion of the chuck and are maintained normally in extended or open position by the action of the springs 40, 41, against the inclined slideways in the chuck head 30.

In order to provide for quickly closing or opening the jaws the interior of the sleeve 34 is provided adjacent its rear end with a segment 39 of screw threads of opposite pitch to the threads 43, or as illustrated herein of right hand pitch, adapted to engage complementary threads 38 on the base of the chuck body. The segmental threads 39 may be formed on the interior of a sleeve 44 which may be fitted within the sleeve 34 and secured thereto in any suitable manner as by means of a screw 45. The threads 38 are channeled as at 46 (Fig. 2) to provide a way through which the segment 39 may slide to permit the jaws to be quickly withdrawn and closed. The ends of the screw threads 38 and 39 are beveled to insure their proper engagement when the slide is drawn backward and rotated to clamp the tool shank. I have found it to be desirable that the bevel should extend from the base toward the forward end in the threads 38 of the chuck and in the opposite direction of the ends of the threads of the segment 39 so that when the sleeve 34 is drawn backward to clamp the tool the points of the threads must pass freely to permit a partial rotation of the sleeve to complete the closing of the jaws. If the beveled ends of the threads contract the sleeve will be forced forward so that the next threads will be engaged thus insuring in either event sufficient rotation of the sleeve to afford a full engagement of the threads of the segment with the coöperating threads 38 of the body portion thereby preventing the possibility of damaging the threads by an insufficient extent of interlocking surfaces during the final movement of the clamping jaws in which said threads are subjected to the maximum strain.

By the construction above described the withdrawal of the jaws to clamping position is effected jointly by the engagement of the right hand screws 38, 39 and the engagement of the left hand screws 42, 43 so that a partial revolution will serve to clamp the jaws on the shank of the tool. In order to prevent more than a single revolution of the sleeve 34 upon the chuck body and to thereby maintain the proper relative position between the jaws and chuck body, a screw 47 is secured in the sleeve so that its end will abut against the opposite sides of one of the edges of the base member 37 of the jaws, the other edge of said base member being cut away to permit the end of the screw to pass so that the sleeve may have nearly a full revolution, but no more.

In operation the workman will drop the squared end of the tool shank into the chuck socket between the jaws 31, 32, draw the sleeve toward him as far as can be done easily, then either give the same a partial turn toward the left, or hold the sleeve stationary and rotate the sweep to the right, whereupon the jaws will close upon and grasp the cylindrical shank of the tool and hold the same in axial alinement with the chuck. This construction provides a wide latitude of adjustment and adapts the chuck for the various tools commonly in use in carpentry.

It will be understood that the embodiment of the invention above described is illustrative merely and is not restrictive and that the same may be embodied in various other constructions within the contemplation of my invention and within the scope of the following claims.

Having thus described my invention what I claim as new and desire to secure by Letters Patent is:

1. The combination with a bit stock having a shoulder piece, a tool engaging chuck in axial alinement therewith and a rigid offset frame forming a sweep, of a hand grip adjustably mounted upon said sweep whereby the effective leverage on the tool carried by the chuck may be varied.

2. The combination with a bit stock having a shoulder piece, a tool holding chuck in axial alinement therewith, and an offset frame forming a sweep, of a hand grip eccentrically mounted upon said sweep, and means for securing the same in adjusted positions whereby the effective leverage upon the tool may be varied.

3. A bit stock having a rotatable shoulder piece, an axially alined holding chuck and an offset frame forming a sweep, a collar having a clutch member carried by said sweep, a cylindrical hand gripping member eccentrically mounted on said sweep and having a head provided with a clutch member adapted to coöperate with the clutch member on said sweep and means to maintain said clutch members normally in interlocked engagement.

4. A bit stock having a rotatable shoulder piece, an axially alined holding chuck and an offset frame forming a sweep, a collar having a clutch member carried by said sweep, a cylindrical hand gripping member eccentrically mounted on said sweep and having a head provided with a clutch member adapted to coöperate with the clutch member on said sweep and means to maintain said clutch members normally in interlocked engagement comprising a helical spring surrounding said handle member and seated upon said collar and the opposite head of said gripping member.

5. A bit stock having a hand grip comprising a pair of circular heads having eccentric alined apertures to receive the handle member of the frame of the bit stock, a cylindrical spacing sleeve for spacing said heads and means for clamping the latter upon said sleeve, a handle rotatably mounted on said sleeve and means for securing said hand grip to said frame in adjusted positions to vary the effective leverage upon the bit.

6. A bit stock having a hand grip comprising a pair of circular heads having eccentric alined apertures to receive the handle member of the frame of the bit stock, a cylindrical spacing sleeve for spacing said heads, a central connecting rod for clamping the latter upon said sleeve, recesses in one of said heads adapted to receive locking members carried by the bit stock frame and resilient means for retaining said recesses and said members normally in interlocking engagement.

7. A bit stock having a hand grip provided with alined eccentrically disposed apertures to receive the sweep of the bit stock and means for securing said hand grip in adjusted positions whereby the effective leverage of the bit stock upon the tool may be varied.

8. A bit stock having a hand grip provided with alined eccentrically disposed apertures to receive the sweep of the bit stock and means for securing said hand grip in adjustable positions whereby the effective leverage of the bit stock upon the tool may be varied, comprising a locking member adapted to engage a coöperating member carried by the bit stock frame.

9. A bit stock having a hand grip provided with alined eccentrically disposed apertures to receive the sweep of the bit stock and means for securing said hand grip in adjustable positions whereby the effective leverage of the bit stock upon the tool may be varied comprising a locking member adapted to engage a coöperating member carried by the bit stock frame and resilient means for retaining said members normally in interlocked relation.

In testimony whereof, I have signed my name to this specification, in the presence of two subscribing witnesses.

JOHN W. LOVERING.

Witnesses:
FREDERICK A. TENNANT,
THOMAS J. DRUMMOND.

Copies of this patent may be obtained for five cents each, by addressing the "Commissioner of Patents, Washington, D. C."